United States Patent
Knoll

(10) Patent No.: US 6,508,228 B2
(45) Date of Patent: Jan. 21, 2003

(54) METHOD OF OPERATION FOR A SPARK-IGNITION, DIRECT-INJECTION INTERNAL COMBUSTION ENGINE

(75) Inventor: Reinhard Knoll, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 09/842,043

(22) Filed: Apr. 26, 2001

(65) Prior Publication Data

US 2001/0035152 A1 Nov. 1, 2001

(30) Foreign Application Priority Data

Apr. 28, 2000 (AT) ........................................ 321/2000 U

(51) Int. Cl.$^7$ .............................. F02B 17/00; F02B 3/10
(52) U.S. Cl. ........................ 123/295; 123/299; 123/305
(58) Field of Search ............................... 123/295, 298, 123/299, 305

(56) References Cited

U.S. PATENT DOCUMENTS 6,062,189 A * 5/2000 Kaneko et al. ............. 123/295
6,067,954 A * 5/2000 Kudou et al. ............... 123/299
6,302,080 B1 * 10/2001 Kato et al. .................. 123/299
6,340,014 B1 * 1/2002 Tomita et al. ............... 123/295

FOREIGN PATENT DOCUMENTS

DE 4441092 5/1996

* cited by examiner

Primary Examiner—Erick Solis
(74) Attorney, Agent, or Firm—Dykema Gossett PLLC

(57) ABSTRACT

The invention relates to a method of operation for a spark-ignition, direct-injection internal combustion engine with at least one ignition device and at least one injection device entering the cylinder chamber, with a main injection of fuel into the cylinder chamber occurring during the intake stroke. In order to improve fuel consumption and emissions it is provided that under conditions of idling and/or partial load a homogeneous fuel air mixture with an air ratio $\lambda \geq 2$ be generated in the cylinder chamber by a main injection process and that an ignition-jet injection into the cylinder chamber with an atomized fuel ignition jet take place during the compression stroke in such a manner that an ignitable, preferably stoichiometric, fuel-air mixture is established in the vicinity of the ignition device and that the homogeneous fuel-air mixture of the main injection is ignited by the ignition jet.

5 Claims, 1 Drawing Sheet

METHOD OF OPERATION FOR A SPARK-IGNITION, DIRECT-INJECTION INTERNAL COMBUSTION ENGINE

BACKGROUND OF THE INVENTION

The invention relates to a method of operation for a spark-ignition, direct-injection internal combustion engine with at least one ignition device entering the cylinder chamber and at least one injection device entering the cylinder chamber, in which the main fuel injection into the cylinder chamber takes place during the intake stroke.

In direct-injection combustion engines with spark ignition fuel is usually injected into the combustion chamber in such a way that a fuel-rich ignitable mixture occurs in the vicinity of the ignition device while a lean fuel air mix prevails elsewhere on average. In this way charge stratification of fuel-rich mixture in an otherwise lean mixture is achieved, enabling the richer mixture to be ignited, while still permitting operation with an air ratio $\lambda > 1$. Due to thorough combustion and favorable thermodynamic conditions owing to unthrottled intake flow high efficiency and low fuel consumption are attained. Practical experience has shown, however, that real fuel consumption lags behind theoretical expectation. A reason for this discrepancy is that in conventional wall-guided systems relatively large heat losses will occur at the walls due to the extreme enlargement of the fuel-wetted piston top surface. Furthermore, the high kinetic energy of the charge required due to charge interchange losses cannot be neglected. Besides, conventional serially produced direct-injection, spark-ignition engines will produce high $NO_x$-emissions due to the large proportion of approximately stoichiometric fuel-air mixtures in the spraycloud, such emissions demanding costly aftertreatment.

DESCRIPTION OF PRIOR ART

From DE 44 41 092 A1 a valve for introducing fuel or fuel-air mixture into the combustion chamber of a combustion engine is known, by means of which an umbrella-shaped or cone-shaped injection jet is generated. To insure ignition of the fuel-air mixture contained in the combustion chamber, an ignition jet is branched off from the umbrella-shaped injection jet, which, on entering the immediate vicinity of the spark plug, causes a fuel-rich fuel-air mixture to be present in the area of the ignition spark. The intention is to achieve a lesser degree of wall wetting and thus a lower HC-content of the exhaust gases and lower fuel consumption.

SUMMARY OF THE INVENTION

It is the object of the present invention to propose an operating method by which fuel consumption and emissions may be optimized in direct-injection, spark-ignition, internal combustion engines.

According to the invention, this object is achieved by providing that, during idling operation and/or under partial load conditions, a homogeneous fuel-air mixture with an air ratio $\lambda > 2$ is established in the cylinder chamber by the air-distributed main injection process, and during the compression stroke an air-atomized fuel ignition jet is injected into the cylinder chamber such that an ignitable, preferably stoichiometric, fuel air mixture is produced in the vicinity of the ignition device and the homogeneous fuel air mixture of the main injection process is ignited by the ignition jet. Thus, during idling and/or under partial load conditions, a homogeneous fuel air mixture introduced at an earlier point in time and having an air ratio $\lambda > 2$ is ignited by an optimally atomized ignition jet.

The combustion process is similar to that of a conventional spark-ignition engine, though characterised by relatively fast propagation of the flame front, which starts out centrally at the fuel-rich ignition core and propagates outwardly with a progressive rise in temperature.

Particularly low emissions of nitrogen oxides and low fume values may be achieved if the injected volume of the ignition jet is a fraction of the main injection volume, preferably at most 10%, and preferably about 5–10% of the main injection volume. Since $NO_x$ or fume emissions are generated almost exclusively in the area of the roughly stoichiometric ignition core, which may be kept very small due to the small amount of fuel in the ignition jet, a substantial improvement of exhaust gas quality may be achieved as compared with conventional direct injected spark ignition engines.

It is particularly advantageous if the combustion engine is unthrottled under partial load and exhaust gas is recycled at least under partial load, such that the air ratio $\lambda$ of the fuel-air mixture of the main injection is set by the amount of recycled exhaust gas. Setting of the air ratio $\lambda$ of the fuel-air mixture introduced by the main injection process may be effected in a simple way by controlling the volume of exhaust gas recycled. Temperature and rate of the recycled exhaust gas may also be used to control combustion speed.

To achieve optimum atomisation of the ignition jet, fuel should be introduced into the cylinder chamber at sufficiently high injection pressure. This may be effected by using an accumulator injection system, for instance, or a pump-and nozzle injection system.

In order to achieve uniform homogenisation of the fuel introduced during the main injection process, it is of particular advantage if a tumble motion of the charge in the cylinder chamber is generated at least during main injection. A tumble flow is a cylindrical flow in the cylinder chamber when the axis of rotation is approximately normal to the cylinder axis. The tumble flow will enhance mixture formation in the main injection phase.

BRIEF DESCRIPTION OF THE DRAWINGS

Following is a description of the invention with reference to the accompanying drawings, FIG. 1 showing a section through the cylinder of a combustion engine operating according to the invention during the intake stroke, while

DETAILED DESCRIPTION OF THE PREFERRED EMBODIMENT

Figure 1:
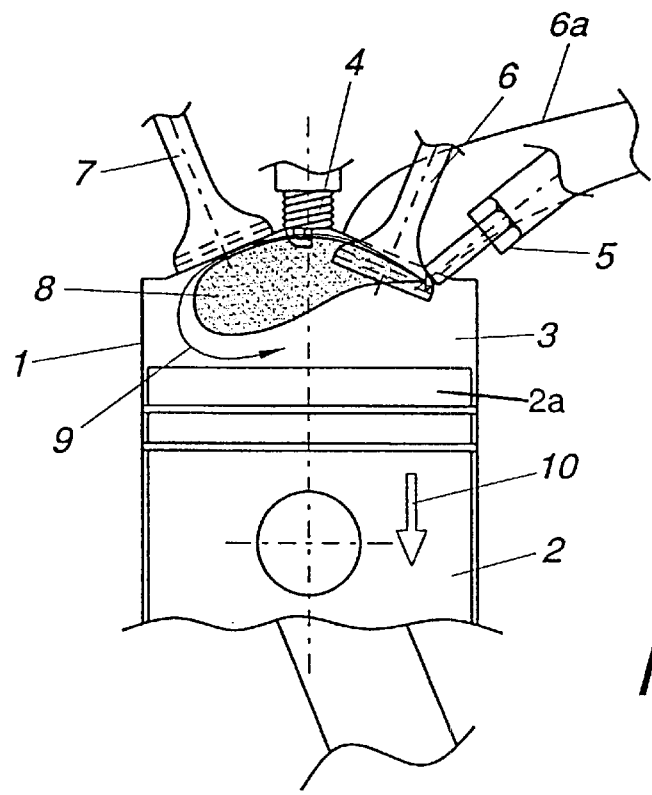

The Figures schematically show a section through a cylinder 1 of a combustion engine in which a reciprocating piston 2 is contained. An ignition device 4, which is centered in the variant shown, and an injection device 5 positioned laterally enter the cylinder chamber 3. Reference number 6 designates an intake valve, reference number 7 an exhaust valve. Any feasible number of ignition devices 4, injection devices 5, intake valves 6 and exhaust valves 7 may be provided.

The injection device 5 is preferably configured as a single aperture nozzle directed towards the ignition device 4.

During the intake stroke shown in FIG. 1, when the intake valve 6 is open, a main injection process is carried out via the injection device 5. The intake port 6a, which is designed to generate a tumble flow, imparts a tumble motion to the fuel-air mixture of the main injection, which is indicated by arrow 9. The tumble motion enhances mixture formation in the main injection phase, thus causing fuel-air mixture 8 of the main injection to fill the cylinder chamber essentially homogenously. The homogenous fuel air mixture of the main injection has an air ratio $\lambda > 2$. Arrow 10 indicates the direction of movement of the piston.

Figure 2:
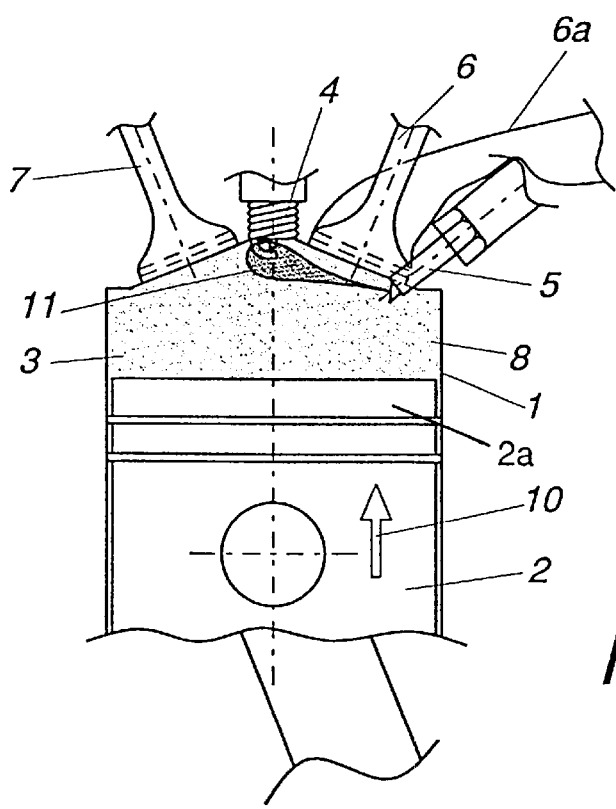
FIG. 2 shows the same section during the compression stroke.

During the compression stroke shown in FIG. 2 injection of an ignition jet takes place, a thoroughly atomized injection jet 11 with an air ratio $\lambda \sim 1$ being injected in the direction towards the ignition device 4. The injection jet 11 is ignited by the ignition device 4 and will in turn ignite the fuel-air mixture spraycloud 8 which is homogeneously distributed in the cylinder chamber 3. Combustion occurs with the flame front propagating very fast which is advantageous for the further development of the combustion process. Propagation of the flame front starts centrally from the fuel-rich ignition core of the ignition jet 11 and continues with progressive temperature increase radially in the cylinder chamber 3.

Since $NO_x$ and possible fume emissions are generated almost exclusively in the area of the roughly stoichiometric ignition core, the amount of fuel in the ignition-jet injection should be kept as small as possible. Good emission values are obtained when the injection volume of the ignition jet lies below 10%, preferably at 5–10%, of the main injection volume.

Operation at partial load is usually unthrottled. Setting of the air ratio $\lambda$ of the main injection volume may be effected by internal or external exhaust gas recycling. Amount and temperature of the recycled exhaust gas may further be utilized to control combustion speed.

To achieve fast and complete combustion good atomization of the ignition jet is essential. Injection should therefore occur at injection pressures which should be as high as possible and may be supplied by accumulator injection systems or by pump-and-nozzle injection systems.

As indicated in FIGS. 1 and 2 the piston top 2a of the piston may be plane, as is known from conventional spark ignited combustion engines.

What is claimed is:

1. A method of operating a spark-ignition, direct injection combustion engine having at least one ignition device and at least one injection device entering cylinder chamber, with a main injection of fuel into the cylinder chamber occurring during an intake stroke, wherein under conditions of idling and/or partial load a homogeneous fuel-air mixture with an air ratio $\lambda \geq 2$ is generated in the cylinder chamber by a main injection process and an ignition jet injection into the cylinder chamber with an atomized fuel ignition jet takes place during a compression stroke in such a manner that an ignitable, fuel-air mixture is established in the vicinity of the ignition device and the homogeneous fuel-air mixture of the main injection is ignited by the ignition jet, the injection volume of the ignition jet amounts at most to 10% of the main injection volume.

2. The method according to claim 1, wherein the injection volume of the ignition jet amounts to 5–10% of the main injection volume.

3. The method according to claim 1, wherein the combustion engine remains unthrottled under partial load conditions and at least under partial load conditions exhaust gas is recycled, setting of the air ratio $\lambda$ of the fuel-air mixture of the main injection being effected by the amount of exhaust gas recycled.

4. The method according to claim 1, wherein a tumble motion of the charge is generated in the cylinder chamber at least during the main injection process.

5. A method of operating a spark-ignition, direct-injection combustion engine during idling or partial load, said combustion engine including a cylinder having a piston reciprocatingly movable therein to provide an intake stroke and a compression stroke relative to a combustion chamber, and an ignition device, an intake valve and an injection device in communication with the combustion chamber, the method comprising the steps of injecting a homogeneous main fuel-air mixture into the combustion chamber through the in take valve during an intake stroke of the piston, and injecting an atomized fuel-air injection jet into the combustion chamber through the injection device during a compression stroke of the piston, thus providing an ignitable fuel-air mixture in the vicinity of the ignition device, a volume of said atomized fuel-air injection jet being no more than 10% of a volume of said homogeneous fuel-air mixture.

* * * * *